UNITED STATES PATENT OFFICE 1,925,905

SUBSTANCE FOR INDICATING THE EXHAUSTION OF GAS PURIFYING MASSES AND A METHOD OF USING THE SAME

Oskar Neumann, Oranienburg, near Berlin, Germany, assignor to Deutsche Gasgluhlicht-Auer-Gesellschaft m. b. H., Berlin, Germany, a corporation of Germany No Drawing. Application September 21, 1929, Serial No. 394,390, and in Germany November 17, 1928

4 Claims. (Cl. 252—2.5)

With protective breathing apparatus it is absolutely necessary in many instances, where the poisonous substance proper such as carbon monoxide cannot be noticed, to provide a device within the apparatus, which will indicate the exhaustion of the purifying agent.

Such exhaustion of the purifying matter is governed in many instances by the moisture present in the gas mixture, as for instance with purifying matter of a catalytic nature, such as hopcalite, which causes combustion of carbon monoxide. Water in the form of vapor has a deleterious action on hopcalite so that it is necessary to choose an indicator which is sensitive to water vapor.

Up to the present there were introduced exclusively within the purifying matter such substances, which possess a characteristic smell or which will generate a substance having a characteristic smell. It was found however, that in many instances the person carrying the apparatus got accustomed to such smell, so that during heavy work its occurrence was no longer noticed. With calcium carbide, for instance, it is not possible at all, to obtain by an increase of the quantity of the warning substance in the purifying apparatus an increased annoyance of smell to the wearer of the said apparatus. For various reasons the application of the quantity of warning substance employed in breathing protective devices is naturally limited through the whole construction of the appliance.

Considerable progress has been made in the art by the present discovery of a substance capable of not only generating in relatively small quantities a warning medium indicating that the gas purifying matter in a breathing apparatus or gas mask is becoming exhausted, but also capable of increasing the concentration of the warning medium, as the purifying matter or filter becomes almost completely exhausted in such a manner that the irritation of the warning medium upon the wearer of the breathing apparatus will increase to a proper annoyance.

A further advantage of any warning medium, which is nitride of magnesium, is that ammonia is generated when the gas purifying matter is becoming exhausted and that the smell of ammonia makes it possible for the wearer to notice the approaching exhaustion of the gas purifying matter. On further exhaustion of said gas purifying matter the said smell of ammonia will ultimately be increased to such a noticeable annoyance that the wearer of the apparatus is warned in time, even if his attention is diverted. Nitride of magnesium was found to be particularly serviceable for these purposes and the said substance possesses the above described advantages even when used in relatively small quantities of about 20 grams and less. The solid products of decomposition of nitride of magnesium will in no way impair the normal operation of the filter of the breathing apparatus. In addition the ammonia is generated in such a concentration that it will not hurt the wearer of the apparatus. Nitride of magnesium is particularly adapted as warning substance in purifying masses, which remove the carbonic oxide catalytically, such as the well known hopcalite which is a mixture of metal oxides such as manganese dioxide, copper oxide, cobaltic oxide and silver oxide. Usually a charge of about 310 grams or so of hopcalite is used in a breathing apparatus.

I claim:

1. In a gas breathing apparatus, the combination of gas purifying matter and magnesium nitride.

2. In a gas breathing apparatus, the combination of gas purifying matter and magnesium nitride, the said magnesium nitride being present in relatively small quantities while being capable of generating such quantities of ammonia that will cause a noticeable annoyance to the wearer of the breathing apparatus prior to the full exhaustion of said gas purifying matter.

3. The method of indicating the exhaustion of gas purifying matter in a breathing apparatus, which comprises causing air passing through the breathing apparatus to come into contact with magnesium nitride whereby ammonia will be generated when the gas purifying matter is approaching exhaustion.

4. In a gas breathing apparatus, gas purifying matter the exhaustion of which is governed by the moisture present in the gas being breathed, in conjunction with magnesium nitride, to develop warning vapors of ammonia by the action of such moisture on said magnesium nitride prior to the full exhaustion of said gas purifying matter.

OSKAR NEUMANN.